United States Patent
Elhamid et al.

(10) Patent No.: US 7,998,631 B2
(45) Date of Patent: Aug. 16, 2011

(54) METHOD TO REDUCE/ELIMINATE SHUNT CURRENT CORROSION OF WET END PLATE IN PEM FUEL CELLS

(75) Inventors: Mahmoud H. Abd Elhamid, Grosse Pointe Woods, MI (US); Youssef M. Mikhail, Sterling Heights, MI (US); Gayatri Vyas Dadheech, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/401,351

(22) Filed: Mar. 10, 2009

(65) Prior Publication Data

US 2010/0233558 A1 Sep. 16, 2010

(51) Int. Cl.
*H01M 8/04* (2006.01)
*H01M 8/24* (2006.01)
*H01M 2/38* (2006.01)
*H01M 2/40* (2006.01)

(52) U.S. Cl. .......... 429/430; 429/452; 429/454

(58) Field of Classification Search .......... 429/12, 429/13, 26, 34, 38, 39, 40, 42, 430, 452, 429/454
See application file for complete search history.

(56) References Cited

U.S. PATENT DOCUMENTS

| | | | | |
|---|---|---|---|---|
| 4,226,694 A * | 10/1980 | Baboian et al. | .......... | 204/196.26 |
| 4,452,683 A * | 6/1984 | de Nora et al. | .......... | 204/196.34 |
| 2002/0058177 A1* | 5/2002 | Nishiyama et al. | ............. | 429/35 |
| 2004/0115513 A1* | 6/2004 | Yang | ............... | 429/38 |

OTHER PUBLICATIONS

Bushman, "Corrosion and Cathodic Protection Theory."*
Unknown, "Corrosion Control and Cathodic Protection Data Sheet."*

* cited by examiner

*Primary Examiner* — Jennifer K. Michener
*Assistant Examiner* — Eli S Mekhlin
(74) *Attorney, Agent, or Firm* — Brooks Kushman P.C.

(57) ABSTRACT

A fuel cell stack includes a first fuel cell assembly and a last fuel cell assembly. The first fuel cell assembly includes a first end plate assembly, which has a first end plate cooling channel adapted to receive a coolant. The last fuel cell assembly includes a last end plate assembly that has a last end plate cooling channel. A first electrical potential exists between the first end plate and the last end plate. The fuel cell stack also includes a connecting cooling channel is in fluid communication with the first end plate cooling channel and the last end plate cooling channel. A coolant is contained within the connecting coolant channel, the first end plate cooling channel, and a last end plate cooling channel. The fuel cell stack further includes a coolant electrode positioned in the coolant channel, which contacts the coolant. A voltage source is in communication with the first end plate and the coolant electrode such that a second electrical potential between the coolant electrode and the first end plate is at a sufficient voltage to impede corrosion of the first end plate.

18 Claims, 2 Drawing Sheets

METHOD TO REDUCE/ELIMINATE SHUNT CURRENT CORROSION OF WET END PLATE IN PEM FUEL CELLS

BACKGROUND OF THE INVENTION

1. Field of the Invention

In at least one embodiment, the present invention is related to bipolar plates used in PEM fuel cells.

2. Background Art

Fuel cells are used as an electrical power source in many applications. In particular, fuel cells are proposed for use in automobiles to replace internal combustion engines. A common fuel cell design uses a solid polymer electrolyte ("SPE") membrane or proton exchange membrane ("PEM"), to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

The electrically conductive plates currently used in fuel cells provide a number of opportunities for improving fuel cell performance. For example, these metallic plates typically include a passive oxide film on their surfaces requiring electrically conductive coatings to minimize the contact resistance. Such electrically conductive coatings include gold and polymeric carbon coatings. Typically, these coatings require expensive equipment that adds to the cost of the finished bipolar plate. Moreover, metallic bipolar plates are also subjected to corrosion during operation. One degradation mechanism includes the release of fluoride ions from the polymeric electrolyte. Metal dissolution of the bipolar plates typically results in release of iron, chromium and nickel ions in various oxidation states.

A complication that occurs in PEM fuel cells is corrosion of the electrically conductive plates at locations coming in contact with the aqueous coolant. The last end plate at the cathode side of a fuel cell stack is particularly susceptible to such corrosion. Moreover, wet end shunt currents flowing through the coolant reduce the efficiency of PEM fuel cells. Such shunt currents depend on the ionic conductivity of, and the potential drop across, the aqueous based coolant. A slight change in coolant conductivity can lead to a significant shunt current, which can then damage the wet end plate if it is made of materials that are prone to corrosion, such as stainless steels. This shunt current is mainly due to oxygen evolution on the wet end coolant port area and hydrogen evolution on the dry end plate.

Accordingly, there is a need for improved methodology for decreasing the corrosion of the electrically conducing metal plates used in fuel cell applications.

SUMMARY OF THE INVENTION

The present invention solves one or more problems of the prior art by providing in at least one embodiment a fuel cell stack with improved corrosion resistance. The fuel cell stack of this embodiment includes a first fuel cell assembly and a last fuel cell assembly. The first fuel cell assembly includes a first end plate assembly, which has a first end plate cooling channel adapted to receive a coolant. The last fuel cell assembly includes a last end plate assembly that has a last end plate cooling channel. The fuel cell stack is characterized by a first electrical potential between the first end plate and the last end plate. A connecting cooling channel is in fluid communication with the first end plate cooling channel and the last end plate cooling channel. A coolant contained within the connecting coolant channel, the first end plate cooling channel, and a last end plate cooling channel. A coolant electrode is positioned in coolant channel and contacts the coolant. A voltage source is in communication with the first end plate and the coolant electrode such that a second electrical potential between the coolant electrode and the first end plate is at a sufficient voltage to impede corrosion of the first end plate.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Figure 1:
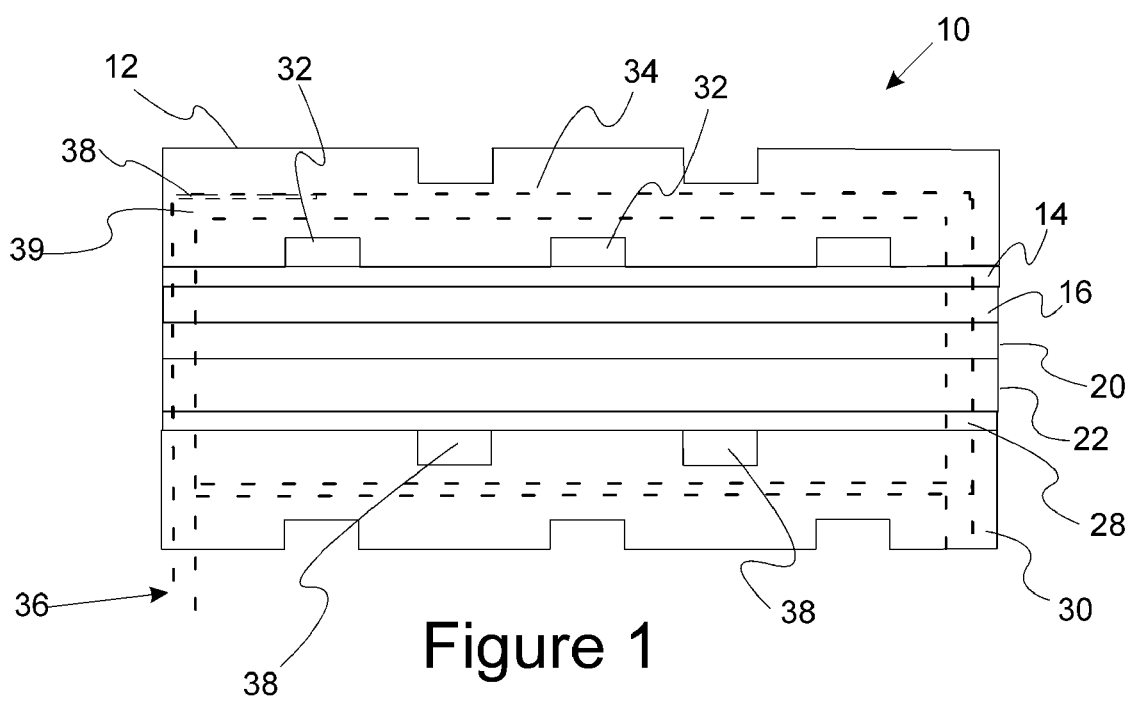
FIG. 1 provides a schematic side view of an example of a fuel cell assembly for inclusion in a fuel cell stack.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application where publications are referenced, the disclosures of these publications in their entireties are hereby incorporated by reference into this application to more fully describe the state of the art to which this invention pertains.

In an exemplary embodiment, a fuel cell having a flow field plate with improved corrosion resistance is provided. The flow field plate of this embodiment includes a cooling channel through which an aqueous coolant flows. The flow field plate comprises a valve metal, which contacts the aqueous coolant at a position that inhibits the formation of shunt currents when the fuel cell is incorporated into a fuel cell stack.

With reference to FIG. 1, an example of a fuel cell assembly for inclusion in a fuel cell stack is provided. Fuel cell 10 includes flow field plate 12. Flow field plate 12 includes a plurality of channels 32 for introducing a first gas into fuel cell 10. Typically, this first gas is comprises oxygen. Diffusion layer 14 is disposed over flow field plate 12. First catalyst layer 16 is disposed over diffusion layer 14. Fuel cell 10 further includes ion conductor layer 20, which is disposed over first catalyst layer 16. Second catalyst layer 22 is disposed over ion conductor layer 20. Fuel cell 10 also includes flow field plate 30 with gas diffusion layer 28 interposed between second catalyst layer 22 and flow field plate 30. In a refinement, one or both of flow field plates 12 and 30 is made from a metal such as stainless steel. Flow field plate 12 includes cooling channel 34, which forms part of cooling system 36 and plurality of channels 38 for introducing a fuel gas (e.g., hydrogen) into fuel cell 10.

Figure 2:
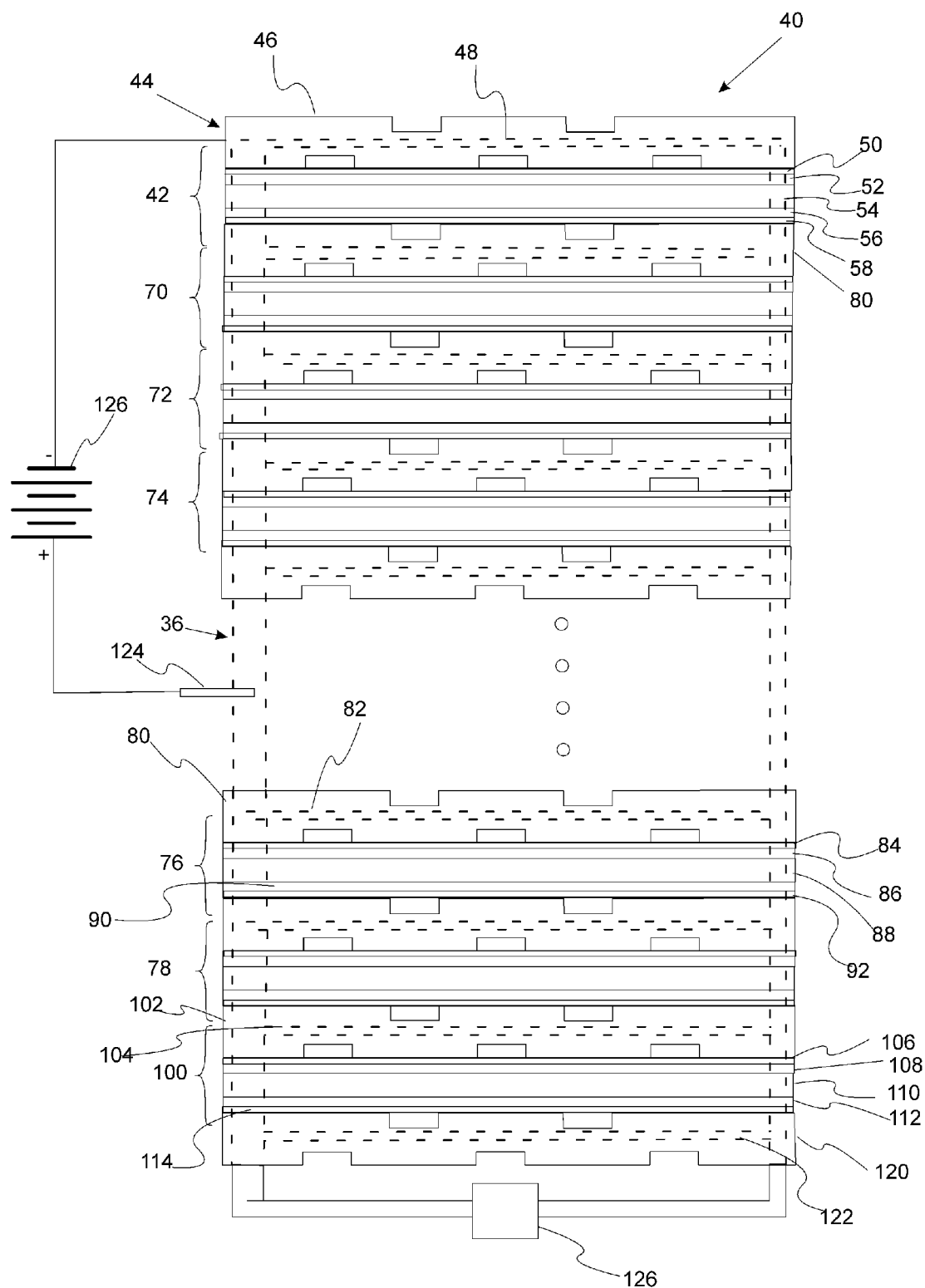
FIG. 2 provided a schematic of a fuel cell stack including a plurality of fuel cells and a coolant electrode.

With reference to FIG. 2, a schematic of a fuel cell stack including a plurality of fuel cells is provided. Fuel cell stacks in current used typically have from about 10 to 200 individual fuel cells. Fuel cell stack 40 includes first fuel cell 42, which is of the general design of the fuel cell depicted in FIG. 1. As such, first fuel cell 42 includes first end plate assembly 44, which includes flow field plate 46. Fuel cell 42 includes gas diffusion layer 50 and first catalyst layer 52. First catalyst layer 52 is disposed over gas diffusion layer 50. Fuel cell 42 also includes first ion conductor layer 54 and second catalyst layer 56. First ion conductor layer 54 is disposed over first catalyst layer 52 while second catalyst layer 56 is disposed over the first ion conductor layer 54. Fuel cell 42 also includes gas diffusion layer 58, which is disposed over second catalyst layer 56. Gas diffusion layer 58 is adjacent to first bipolar plate 80, which is also part of fuel cell 70.

Fuel cell stack 40 also includes a plurality of intermediate fuel cell assemblies 70-78. Each intermediate fuel cell includes intermediate fuel cell bipolar plate 80, which also is part of an adjacent fuel cell assembly. Intermediate fuel cell bipolar plate 80 includes intermediate cooling channel 82 and first intermediate diffusion layer 84. First intermediate diffusion layer 84 is disposed over intermediate fuel cell bipolar plate 80. Each of fuel cell assemblies 70-78 also includes first intermediate catalyst layer 86, which is positioned over first intermediate diffusion layer 84. Fuel cell ion conductor layer 88 is positioned between first intermediate catalyst layer 86 and second intermediate catalyst layer 90 with second intermediate diffusion layer 92 being disposed over second intermediate catalyst layer 90.

Still referring to FIG. 2, fuel cell stack 40 also includes last fuel cell assembly 100. Last fuel cell 100 includes last bipolar plate 102, which is also part of an adjacent fuel cell assembly. Bipolar plate 102 includes last bipolar plate cooling channel 104. Last fuel cell 100 also includes first diffusion layer 106 and first catalyst layer 108. First diffusion layer 106 is disposed over last bipolar plate 102 while first catalyst layer 108 is disposed over first diffusion layer 106. Fuel cell 100 also includes last ion conductor layer 110, second catalyst layer 112, and second diffusion layer 114. Ion conductor layer 110 is disposed over first catalyst layer 108 with second catalyst layer 112 being disposed between ion conductor layer 110 and second diffusion layer 114. Fuel cell 100 includes last end plate 120, which includes last end plate cooling channel 122.

Fuel cell stack 40 is characterized by a first electrical potential between first flow field plate 46 and last end plate 120. Typically, first flow field plate 46 is positive with respect to last end plate 120. The first electrical potential is characterized by an open circuit voltage that depends on the number of individual fuel cells in fuel cell stack 40. In further refinement, the first electrical potential is from about 100 to 600 volts.

Still referring to FIG. 2, fuel cell stack 40 also includes cooling system 36 which is in communication with the first end plate cooling channel, intermediate bipolar plate cooling channel(s), the last bipolar plate cooling channel, and the last end plate cooling channel. Coolant electrode 124 is positioned in the cooling system and in particular a cooling channel. Coolant electrode 124 is positively biased at a second electrical potential with respect to first flow field plate 46. That is, coolant electrode 124 is positive with respect to first flow field plate 46. Voltage source 126 is used to bias coolant electrode 124. In a refinement, voltage source 126 is a DC voltage source. Generally, the voltage source with set coolant voltage at a sufficient potential to reduce corrosion of first flow field plate 46 relative to a similar fuel cell stack with such a coolant electrode over a predefined period of time. In a further refinement, the second potential is sufficient to reduce corrosion by at least 10% over the predetermined period of time. In still refinement, the second potential is sufficient to reduce corrosion by at least 30% over the predetermined period of time. In yet refinement, the second potential is sufficient to reduce corrosion by at least 50% over the predetermined period of time. In a refinement, the second electrical potential is greater than or equal to the first electrical potential. In particular, the second electrical potential is greater than or equal to the open circuit voltage between first flow field plate 46 and last end plate 120. Therefore, it is readily recognized that the second potential will depend on the size of the fuel cell stack. For example, if the open circuit voltage of the stack is 600V, the second electrical potential is equal to or greater than 600 V. In another refinement, the second potential is from about 100 to 600 volts. Cooling system 36 includes recirculation system 126 for providing coolant to fuel cell stack 40. In a refinement, the coolant comprises water (i.e., the coolant is an aqueous coolant).

In a variation of the present embodiment, coolant electrode 124 comprises a valve metal. Examples of suitable valve metals include titanium, tantalum, niobium, and alloys thereof. In a further refinement, coolant electrode 124 further comprises a precious metal layer disposed over at least a portion of the valve metal, the precious metal layer being selected from the group consisting of platinum, palladium, gold, and combinations thereof.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fuel cell stack comprising:
    a first fuel cell assembly comprising a first end plate assembly, the first end plate assembly having a first end plate cooling channel adapted to receive a coolant;
    a last fuel cell assembly comprising a last end plate assembly, the last end plate assembly having a last end plate cooling channel, wherein a first electrical potential is established between the first end plate and the last end plate;
    a connecting coolant channel in fluid communication with the first end plate cooling channel and the last end plate cooling channel;
    a coolant contained within the connecting coolant channel, the first end plate cooling channel, and a last end plate cooling channel;
    a coolant electrode positioned in the connecting coolant channel and contacting the coolant; and
    a voltage source in communication with the first end plate and the coolant electrode such that a second electrical potential between the coolant electrode and the first end plate is at a sufficient voltage to impede corrosion of the first end plate.

2. The fuel cell stack of claim 1 wherein the second electrical potential is greater than or equal to the first electrical potential.

3. The fuel cell stack of claim 2 wherein the first electrical potential is an open circuit voltage.

4. The fuel cell stack of claim 3 wherein the voltage source is a DC voltage source.

5. The fuel cell stack of claim 4 wherein the second potential is greater than the open circuit potential.

6. The fuel cell stack of claim 1 wherein the second electrical potential is sufficient to reduce corrosion of the first end plate by at least 10%.

7. The fuel cell stack of claim 1 further comprising a plurality of intermediate fuel cell assemblies between the first and last fuel cell assemblies.

8. The fuel cell stack of claim 7 comprising a plurality of intermediate fuel cells.

9. The fuel cell stack of claim 7 wherein each intermediate fuel cell assembly independently includes:
    a first bipolar plate including a first bipolar plate-cooling channel;
    a first diffusion layer disposed over the first bipolar plate;
    a first catalyst layer disposed over the first diffusion layer;
    an ion conductor layer disposed over the first catalyst layer;
    a second catalyst layer disposed over the ion conductor layer;
    a second diffusion layer disposed over the second catalyst layer; and
    a second bipolar plate disposed over the second diffusion layer, the second bipolar plate including a second bipolar plate-cooling channel.

10. The fuel cell stack of claim 1 wherein the coolant electrode comprises a valve metal.

11. The fuel cell stack of claim 10 wherein the valve metal is selected from the group consisting of titanium, tantalum, niobium, and alloys thereof.

12. The fuel cell stack of claim 11 wherein the coolant electrode further comprises a precious metal layer disposed over at least a portion of the valve metal, the precious metal layer being selected from the group consisting of platinum, palladium, gold, and combinations thereof.

13. The fuel cell stack of claim 1 wherein the coolant comprises water.

14. A fuel cell stack comprising:
    a first fuel cell assembly comprising a first end plate assembly, the first end plate assembly having a first end plate cooling channel adapted to receive an aqueous coolant;
    a last fuel cell assembly comprising a last end plate assembly, the last end plate assembly having a last end plate cooling channel, wherein a first electrical potential is established between the first end plate and the last end plate;
    a connecting coolant channel in fluid communication with the first end plate cooling channel and the last end plate cooling channel;
    an aqueous coolant contained within the connecting coolant channel, the first end plate cooling channel, and a last end plate cooling channel;
    a coolant electrode positioned in the connecting coolant channel and contacting the coolant, the coolant electrode comprising a valve metal at least partially coated with precious metal; and
    a DC voltage source in communication with the last end plate and the coolant electrode such that a second electrical potential between the coolant electrode and the last end plate is equal to or greater than the first electrical potential.

15. The fuel cell stack of claim 14 wherein the second potential is greater than or equal to the open circuit potential.

16. The fuel cell stack of claim 14 further comprising a plurality of intermediate fuel cell assemblies between the first and last fuel cell assemblies.

17. The fuel cell stack of claim 16 wherein each intermediate fuel cell assembly independently includes:
    a first bipolar plate including a first bipolar plate-cooling channel;
    a first diffusion layer disposed over the first bipolar plate;
    a first catalyst layer disposed over the first diffusion layer;
    an ion conductor layer disposed over the first catalyst layer;

a second catalyst layer disposed over the ion conductor layer;
a second diffusion layer disposed over the second catalyst layer; and
a second bipolar plate disposed over the second diffusion layer, the second bipolar plate including a second bipolar plate-cooling channel.

18. A fuel cell stack comprising:
a first fuel cell assembly comprising a first end plate assembly, the first end plate assembly having a first end plate cooling channel adapted to receive an aqueous coolant;
a last fuel cell assembly comprising a last end plate assembly, the last end plate assembly having a last end plate cooling channel, wherein a first electrical potential is established between the first end plate and the last end plate;
a plurality of intermediate fuel cell assemblies between the first and last fuel cell assemblies;
a connecting coolant channel in fluid communication with the first end plate cooling channel and the last end plate cooling channel;
an aqueous coolant contained within the connecting coolant channel, the first end plate cooling channel, and a last end plate cooling channel;
a coolant electrode positioned in the connecting coolant channel and contacting the coolant, the coolant electrode comprising a valve metal at least partially coated with precious metal; and
a DC voltage source in communication with the first end plate and the coolant electrode such that a second electrical potential between the coolant electrode and the first end plate is equal to or greater than the first electrical potential.

* * * * *